US005726453A

United States Patent [19]
Lott et al.

[11] Patent Number: 5,726,453
[45] Date of Patent: Mar. 10, 1998

[54] RADIATION RESISTANT SOLID STATE NEUTRON DETECTOR

[75] Inventors: Randy G. Lott, Pittsburgh; Frank H. Ruddy, Monroeville; Abdul R. Dulloo, Pittsburgh, all of Pa.

[73] Assignee: Westinghouse Electric Corporation, Pittsburgh, Pa.

[21] Appl. No.: 722,388

[22] Filed: Sep. 30, 1996

[51] Int. Cl.⁶ .................................................. G01T 3/08
[52] U.S. Cl. ........................ 250/390.01; 250/370.05; 250/390.11; 257/429
[58] Field of Search .................. 250/370.05, 390.01, 250/390.11; 257/429

[56] References Cited

U.S. PATENT DOCUMENTS

| 3,227,876 | 1/1966 | Ross . |
| 3,805,078 | 4/1974 | Kozlov . |
| 3,832,668 | 8/1974 | Berman . |
| 4,267,454 | 5/1981 | Playfoot et al. . |
| 4,284,893 | 8/1981 | Allan et al. . |
| 4,419,578 | 12/1983 | Kress . |
| 5,378,921 | 1/1995 | Ueda . |

FOREIGN PATENT DOCUMENTS

| 52-60085 | 5/1977 | Japan | 257/429 |
| 55-95886 | 7/1980 | Japan | 250/370.05 |
| 2-27776 | 1/1990 | Japan | 257/429 |

Primary Examiner—Edward J. Glick

[57] ABSTRACT

A radiation resistant solid state neutron detector is disclosed. The detector uses a neutron convertor material such as boron or lithium to react with neutrons to create charged particles that are received in a semiconductor active region of the detector. The active thickness of the detector is smaller than the range of the charged particles. Since most of the radiation damage produced by impinging charged particles occurs near the end of the range of the particles, displacement damage predominantly occurs outside of the active region. Although the charged particles pass through the semiconductor material, the particles cause electron excitation within the semiconductor material which is detected in the form of an electronic pulse. A preferred semiconductor material for the active region is silicon carbide. The detectors provide increased resistance to radiation damage, improve high temperature operation, and the ability to obtain real time measurements of neutron flux in reactor cavities and other previously inaccessible locations.

32 Claims, 3 Drawing Sheets

5,726,453

RADIATION RESISTANT SOLID STATE NEUTRON DETECTOR

FIELD OF THE INVENTION

The present invention relates to neutron detectors, and more particularly relates to radiation resistant neutron detectors including a semiconductor active region having a very low susceptibility to radiation damage.

BACKGROUND INFORMATION

Conventional neutron detectors typically include devices which operate as ionization chambers or proportional counters, both of which use a neutron active gas such as $BF_3$ or He. Upon absorption of neutrons, such gases release energetic reaction particles. These particles produce ionizations in the surrounding gas which are detected by appropriately biased electrodes. Other detectors coat the walls of the ionization chamber with a solid neutron active material such as $^6Li$, $^{10}B$ or $^{235}U$. These materials also absorb neutrons and release particles which produce ionizations.

Solid state neutron detectors detect electron-hole pairs that cross a semiconductor junction. The electron-hole pairs are produced by reaction particles formed as result of neutron absorptions within films or dopants of neutron active material incorporated within the detector. One such solid state neutron detector is disclosed in U.S. Pat. No. 3,227,876 to Ross, which includes a silicon semiconductor having a layer doped with boron. Neutrons are absorbed by the boron layer, thereby creating energetic reaction particles which, in turn, create electron-hole pairs that diffuse into and across the junction to produce a current pulse. The detector may be encapsulated by a layer of hydrogenous moderator material a few centimeters thick in order to reduce the speed of incoming neutrons. Such detectors are susceptible to radiation damage and are not capable of operating at temperatures above 30° or 40° C. for extended periods of time, making them unsuitable for use in high temperature, high radiation environments.

U.S. Pat. No. 3,805,078 to Kozlov discloses a solid state neutron detector including at least one layer of diamond crystal.

U.S. Pat. No. 4,419,578 to Kress discloses another solid state neutron detector which uses a hydrogen containing semiconductor material.

A problem with prior art neutron detectors is sensitivity of the detector to non-neutronic components of the radiation field, particularly gamma ray sensitivity. Gas filled detectors are favored in nuclear reactor applications because low density gases are inherently inefficient detectors for gamma rays which deposit their energy over large volumes. In contrast, solid state detectors are more sensitive to gamma rays because of their higher electron density.

Another problem with conventional neutron detectors used in nuclear reactors is their inability to operate over the entire power range of the reactor. Different types of gas filled detectors are currently used during start up (less than 1 $n/cm^2/sec$), ramp up ($10^3$–$10^7$ $n/cm^2/sec$), and full power ($10^9$–$10^{11}$ $n/cm^2/sec$) of the nuclear reactor.

A need exists for neutron detectors capable of operating for extended periods of time in hostile radiation environments such as inside nuclear cores and reactor cavities. The solid state neutron detector of the present invention eliminates or reduces many of the problems formerly associated with gas filled and solid state electronic detectors.

SUMMARY OF THE INVENTION

The radiation resistant neutron detector of the present invention includes a neutron converter material and a semiconductor active region. The neutron converter comprises a material such as boron or lithium which reacts with neutrons to create charged particles. The semiconductor active region is positioned such that it receives charged particles from the neutron converter material. In order to avoid displacement damage in the active region, the thickness of the semiconductor is smaller than the range of the charged particles. As the charged particles pass through the semiconductor active region, the particles cause ionization within the semiconductor material which is detected in the form of an electronic pulse.

An object of the present invention is to provide a neutron detector having improved radiation resistance.

Another object of the present invention is to provide a neutron detector that is capable of operating at relatively high temperatures.

A further object of the present invention is to provide a neutron detector that is capable of measuring neutron flux in reactor cavities and other inaccessible locations.

Another object of the present invention is to provide a neutron detector that is insensitive to gamma radiation.

A further object of the present invention is to provide a neutron detector that can be used to measure a wide range of nuclear fluxes, such as those generated during start up, ramp up and full power of a nuclear reactor.

Another object of the present invention is to provide a neutron detector including a neutron converter layer capable of generating charged particles upon impingement of the neutron converter layer by neutrons, and a semiconductor active region structured to receive charged particles from the neutron converter layer and to generate an electronic pulse in response to ionization caused by the charged particles, wherein the semiconductor active region has a thicknesses smaller than the range of the charged particles.

These and other objects of the present invention will be more apparent from the following description.

DESCRIPTION OF THE PREFERRED EMBODIMENTS

The neutron detector of the present invention comprises a neutron converter layer and a semiconductor active region which is designed to avoid radiation damage to the semiconductor material. Deterioration of prior art solid state radiation detectors caused by damage by energetic particles is a well known phenomenon. The accumulation of radiation damage in the semiconductor material leads to increased leakage current and decreased charge collection efficiency. This radiation damage is caused by the displacement of atoms in the semiconductor by the energetic charged particles. Over time, this damage causes substantial deterioration of detector performance.

As a charged particle loses energy in a material, it creates both electron excitation events and displaced atoms. The energy loss can be described by the Bragg curve. The neutron detector of the present invention takes advantage of the change in the partitioning between electronic excitation and displacement events along the range of the charged particle. For high energy alpha particles ($^4$He ions), electron excitation is the predominant energy loss mechanism. As the particle loses energy, the importance of displacement damage increases. Most of the displacement damage therefore occurs near the end of the range of travel of the charged particles.

In the neutron detector of the present invention, the type of neutron converter layer, the type of semiconductor material, and the thickness and placement of the semiconductor active region are controlled to allow the charged particles to pass through the active semiconductor region without substantial displacement damage. The semiconductor active region is sufficiently thin to avoid displacement damage, but is thick enough to allow sufficient ionization or electron excitation to create a measurable electronic pulse. The relatively thin semiconductor detector of the present invention is substantially less susceptible to radiation damage than conventional thick semiconductor detectors.

Figure 1:
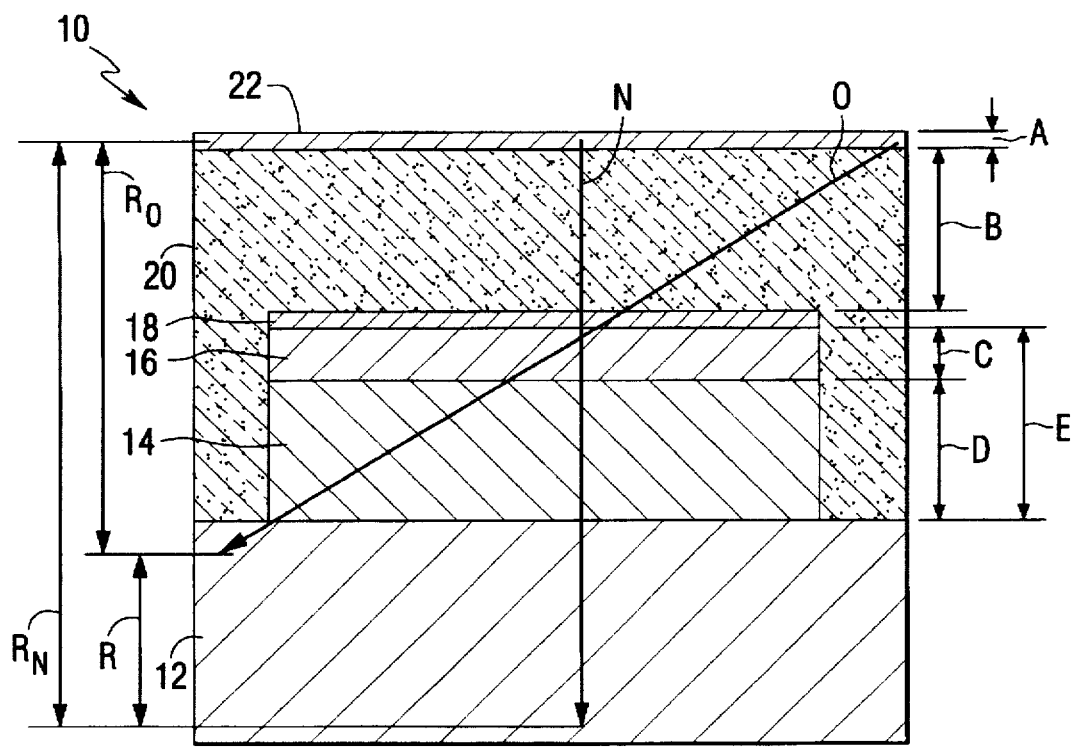
FIG. 1 is a partially schematic side sectional view of a solid state neutron detector in accordance with an embodiment of the present invention.

FIG. 1 schematically illustrates a neutron detector in accordance with an embodiment of the present invention. FIG. 1 is not drawn to scale for purposes of illustration. The neutron detector 10 preferably includes a substrate 12 made of a semiconductor material such as SiC, GaAs, CdTe, diamond, Ge, Si or other appropriate material. The substrate D preferably has a thickness of about 100 to 1000 microns. For high temperature operations, the substrate 12 is preferably made of temperature resistant materials such as SiC, diamond, silicon nitride, gallium nitride and indium nitride. Where SiC is used as the substrate 12 it may be doped with sufficient amounts of nitrogen or other appropriate impurities to provide sufficient conductivity. The substrate 12 may be formed by processes such as high-purity crystal growth or chemical vapor deposition.

In the embodiment shown in FIG. 1, a semiconductor P-N junction is formed by an N-type semiconductor layer 14 and a P-type semiconductor layer 16. The N-type and P-type semiconductor layers 14 and 16 define the semiconductor active region of the neutron detector 10. Silicon and germanium are suitable semiconductor materials. However, for high temperature operations, the semiconductor active region 14, 16 is preferably made of temperature resistant materials capable of operating at temperatures above 100° C., such as SiC, diamond, GaAs, GaP, PbO and CdS. Where SiC is used as the N-type and P-type layers, such layers are preferably formed by chemical vapor deposition of layers containing an appropriate amount of impurity atoms to increase conductivity. For example, when nitrogen is the dopant, typical concentrations in the N- and P-type layers are about $10^{15}$ and greater than about $10^{19}$ atoms per cm$^3$, respectively. While the active region shown in FIG. 1 comprises a P-N junction, other types of solid state active regions may be used such as Schottky diodes, diffused junction devices, ion implanted diodes or surface barrier detectors.

In the embodiment of FIG. 1, electrical contacts are made to the semiconductor active region 14, 16 by means of the conductive substrate 12 and a thin conductive contact 18. Conventional electrical connections may be made to the substrate 12 and the contact 18 to receive electronic pulses from the semiconductor active region 14, 16 during operation of the detector. The contact 18 preferably has a thickness of from about 0.075 to 1 micron, and is made of any suitable material such as gold, platinum, aluminum, titanium or nickel.

An optional insulating material 20 may be provided around at least a portion of the semiconductor active region 14, 16 in order to protect the active region from mechanical stresses and/or chemical attack. The insulating material 20 may also be used to space the semiconductor active region 14, 16 a desired distance from a neutron converter layer 22, as more fully described below. The insulating material 20 may comprise any suitable material such as oxides, nitrides and phosphides. For high temperature operations, oxides such as SiO$_2$ are particularly suitable. The SiO$_2$ layer may be formed by methods such as chemical vapor deposition.

The neutron detector 10 includes a neutron converter layer 22 which generates charged particles when the layer is impinged by neutrons. The neutron converter layer may comprise a relatively thin film or coating, or may comprise a doped region of the device. The composition of the neutron converter layer 22 is selected such that upon impingement by neutrons, charged particles such as $^1$H, $^3$H, $^7$Li and $^4$He ions are generated. Species capable of generating such charged particles include $^6$Li, $^{10}$B, H, and $^3$He. Alternatively, fissionable materials such as $^{235}$U, $^{233}$U or $^{239}$Pu can be used to produce charged particles in the form of energetic fission fragments. Suitable materials for the neutron converter layer 22 include Li-containing materials such as LiF, Li$_2$O and lithium metal, and B-containing materials such as ZrB$_2$, B$_4$C, H$_3$BO$_3$ and elemental boron. The neutron converter layer 22 may be deposited on the insulating material 20 shown in FIG. 1 by chemical vapor deposition, or manufactured as a free-standing layer which is attached to the device. Alternatively, the neutron converter layer 22 may be deposited directly on the semiconductor active region 14, 16. In this case, the neutron converter layer 22 may be used as an electrical contact in place of the contact 18. For example, the contact 18 may be doped with Li to serve a dual purpose as an electrical contact and a neutron converter layer.

In accordance with the present invention, the size of the semiconductor active region 14, 16 and its placement in relation to the neutron converter layer 22 are controlled in order to minimize radiation damage. As shown in FIG. 1, the neutron converter layer 22 is relatively thin, having a thickness A preferably ranging from about 0.1 to about 10 microns. The optional insulating material 20 has a thickness B which is selected in order to minimize displacement damage caused by charged particles, as more fully described below. The thickness B of the insulating material 20 typically ranges from 0 to 10 microns or more. The P-type semiconductor layer 16 has a thickness C, while the N-type semiconductor layer 14 has a thickness D. The thickness C preferably ranges from about 0.1 to about 5 microns, while the thickness D preferably ranges from about 1 to about 10 microns. The semiconductor active region, which is defined by the N-type and P-type layers 14 and 16, has a thickness E. The thickness E preferably ranges from about 1 to about 15 microns, and is selected such that dislocation damage caused by charged particles is minimized.

As shown in FIG. 1, upon impingement by neutrons, some charged particles exit the neutron converter layer 12 in a normal direction N. As more fully described below, a charged particle traveling along direction N will cause electron excitation events as it travels, and will eventually come to rest a distance $R_N$ from the neutron converter layer 22. The semiconductor active region 14, 16 having the thickness E is positioned in relation to the neutron converter layer 22 such that the charged particles traveling in the direction N cause ionization within the thickness of the semiconductor active region E, and pass through the active region before they come to rest. In this manner, dislocation damage within the active region is prevented.

As shown in FIG. 1, charged particles exiting the neutron converter layer 22 will also travel at non-normal angles, such as in the oblique direction O. Charged particles traveling along direction O pass through the semiconductor active region 14, 16 and come to rest a distance $R_O$ from the neutron converter layer 22. The charged particles thus pass through the semiconductor active region 14, 16 in many different directions ranging from normal angles N to relatively shallow oblique angles O. The range of the charged particles is defined by a band R which is located away from the neutron converter layer a minimum distance of $R_O$ and a maximum distance of $R_N$. As schematically shown in FIG. 1, the range of the charged particles falls in a band R outside of the semiconductor active region 14, 16. Instead of causing dislocation damage within the active region, the charged particles come to rest in the substrate 12.

While the active region shown in FIG. 1 comprises a P-N junction, other types of solid state diodes may be used. For instance, the P and N layers of the P-N junction could be replaced with metal/$n^-$/$n^+$ Schottky diode layers. Thus, for example, a Schottky diode may be used comprising a contact metal layer of Au, Ni or Pt, an $n^-$ layer of SiC, an $n^+$ layer of SiC, and a conductive SiC substrate.

Figure 2:
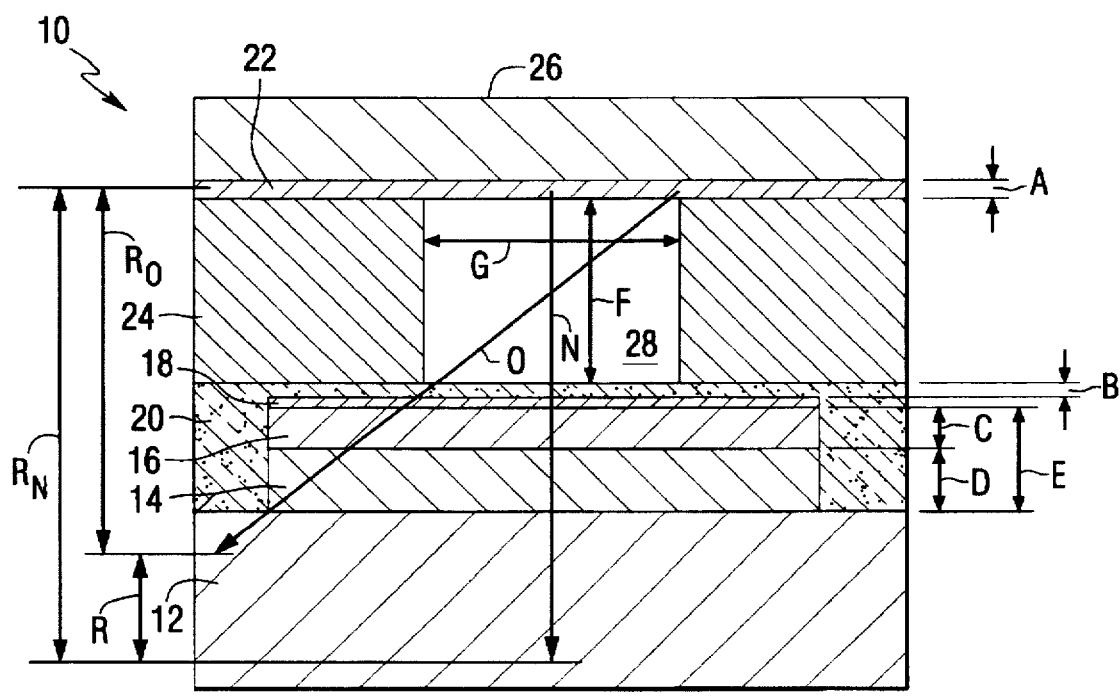
FIG. 2 is a partially schematic side sectional view of a solid state neutron detector in accordance with another embodiment of the present invention.

FIG. 2 schematically illustrates a neutron detector 10 in accordance with another embodiment of the present invention. The detector 10 of FIG. 2 likewise includes a substrate 12 having an N-type semiconductor layer 14 and P-type semiconductor layer 16 disposed thereon. An electrical contact 18 and optional insulating material 20 are also incorporated in the detector of FIG. 2. A collimator 24 is positioned between the active region 14, 16 and the neutron converter layer 22. The collimator 24 may be made of any suitable ion absorbing material such as $SiO_2$, SiC or silicon nitride. The collimator 24 includes an inner passage 28 having a length F and a width G. The inner passage may comprise a gas such as air, nitrogen or helium. A cap 26 made of any suitable material such as aluminum or nickel provides support for the neutron converter layer 22. The collimator 24 is used to reduce the number of charged particles which enter the semiconductor active region 14, 16 at shallow angles. The height F of the inner passage 28 is preferably at least twice the width G of the passage. Charged particles exiting the neutron converter layer 22 at highly oblique angles are absorbed by the walls of the collimator 24 and do not pass into the active region 14, 16.

As shown in FIG. 2, charged particles traveling in a normal direction N come to rest a distance $R_N$ from the neutron converter layer 22. Charged particles traveling in an oblique direction O come to rest a distance $R_O$ away from the neutron converter layer 22. The range of the charged particles is defined by a band R which is located a minimum distance $R_O$ from the neutron converter layer 22 and a maximum distance $R_N$ from the neutron converter layer. By increasing the ratio of the height F to width G of the inner passage 28, the maximum angle between the normal direction N and oblique direction O is decreased, thereby decreasing the width of the band R.

Figure 3:
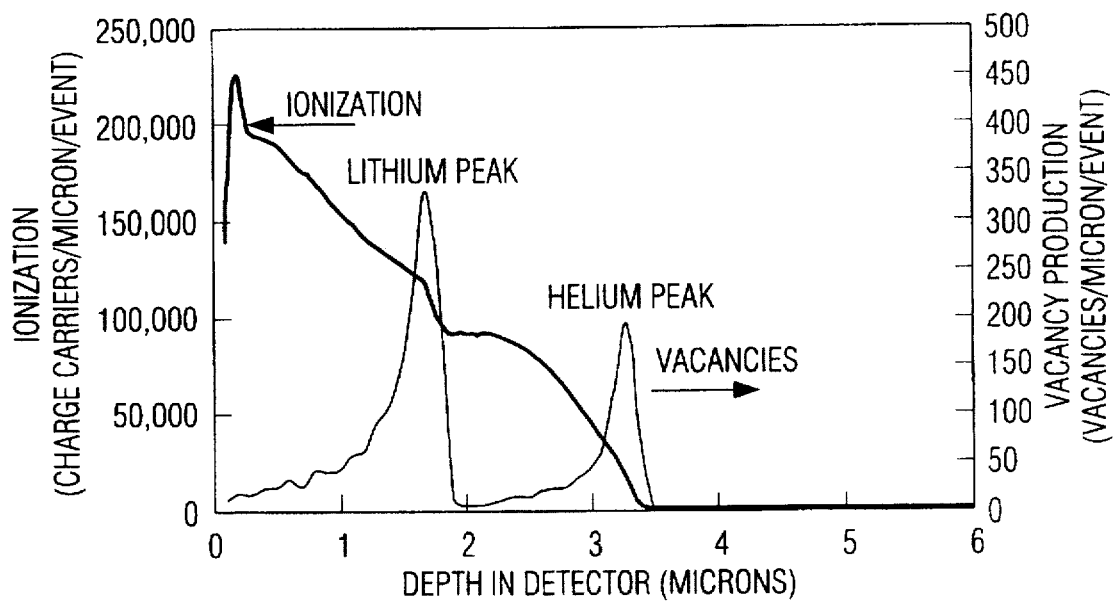
FIG. 3 is a graph of detector depth versus ionization and vacancy production for $^{10}B$ reaction products in a silicon carbide detector.

In accordance with the present invention, energy deposition curves for charged particles in the detector material may be used to determine the appropriate thickness of the semiconductor active region. Such energy deposition curves may be established from the TRIM computer code developed by Biersack and Ziegler, or other conventional range-energy calculation methods. The distribution curves for ionization and vacancy production by a normally incident beam of $^{10}B$ reaction products in SiC is illustrated in FIG. 3. The reaction products comprise charged particles of Li and He ions. Due to its relatively high atomic number (Z), the range of the Li ion is relatively short, i.e., about 1.75 microns. The range of the He ion is nearly double the Li ion range. The displacement damage caused by each type of ion occurs near the end of the range. As shown in FIG. 3, in the first micron, the energy loss to ionization is relatively high and only minimal displacement damage occurs. At about 1.6 microns displacement damage caused by Li ions reaches a peak. After about 1.8 microns ionization energy loss again dominates displacement damage. However, at about 3.3 microns dislocation damage caused by He ions reaches a peak. In order to avoid dislocation damage, the semiconductor active region is positioned in a region where ionization energy loss is high and displacement damage is low. Thus, for a normally incident beam of reaction products, the SiC active region may be positioned at a distance of less than about 1.5 microns from the boron neutron converted layer and/or at a distance between about 1.8 and 3.1 microns from the neutron converter layer.

Figure 4:
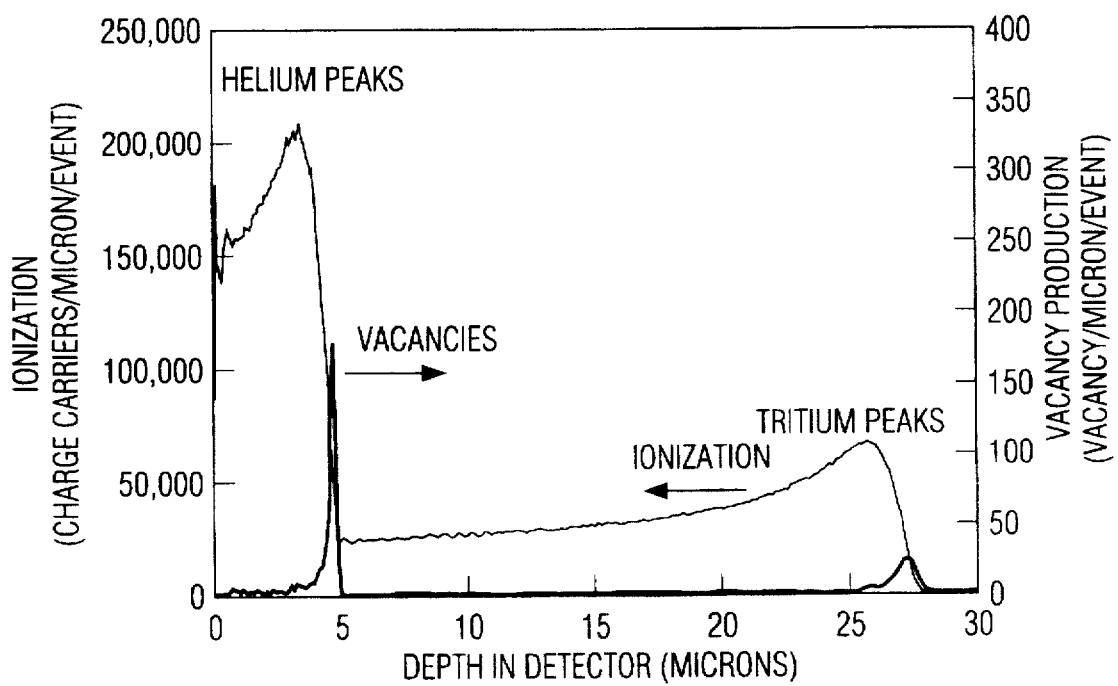
FIG. 4 is a graph of detector depth versus ionization and vacancy production for $^6Li$ reaction products in a silicon carbide detector.

FIG. 4 illustrates energy loss curves for a normally incident beam of $^6Li$ reaction products in SiC. The reaction products comprise charged particles of $^4He$ and $^3H$ (tritium) ions. In comparison with the $^{10}B$ reaction products shown in FIG. 3, the near surface low damage zone is larger for the lower Z, higher energy products of the $^6Li$ reaction. As shown in FIG. 4, the He ions are the higher Z products with a shorter range of about 4.5 or 5 microns. The H ions have a longer range of about 27 microns. For the lithium reaction products, the low damage region extends over approximately the first 4 microns of the detector. At about 5 microns, dislocation damage caused by He ions reaches a peak, but quickly subsides thereafter. From about 5 microns to about 27 microns, ionization energy loss is again maximized. However, at about 27 microns dislocation damage caused by H ions reaches a peak. Thus, for a normally incident beam of reaction products, the SiC semiconductor active region should therefore be located at a distance of less than about 4 microns from the lithium neutron converter layer and/or at a distance between about 5 and 27 microns from the neutron converter layer.

Figure 5:
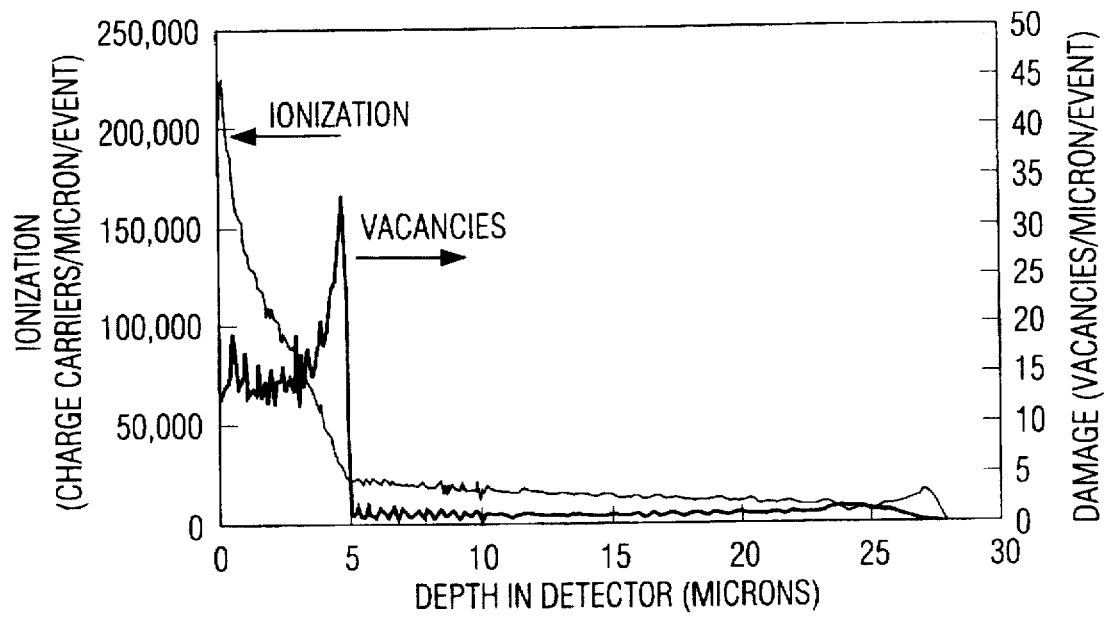
FIG. 5 is a graph of detector depth versus ionization and vacancy production for $^6Li$ reaction products in a silicon carbide detector for randomly distributed reaction products.

As discussed above, the neutron detector of the present invention is preferably provided with an active zone that corresponds to a region with a high ratio of ionization energy loss to displacement damage production. The spacing between the neutron convertor layer and the active region of the detector is preferably controlled depending on the incident radiation. For a normally incident beam, the neutron convertor layer may advantageously be placed adjacent to the semiconductor active region. However, the angular distribution of reaction product ions exiting the neutron convertor layer is usually random. This leads to a broadening of the energy dissipation curves as illustrated in FIG. 5 for the $^6Li$ reaction. For this broadened curve, with SiC as the semiconductor active region, the maximum ionization to displacement ratio occurs between about 5 and 15 microns. Thus, the SiC active region is preferably about 5 to 10 microns thick and is spaced about 5 microns from the neutron converter layer. The semiconductor active region is thereby positioned away from the neutron converter layer in a location where the ratio of ionization energy loss to displacement damage is maximized.

Figure 6:
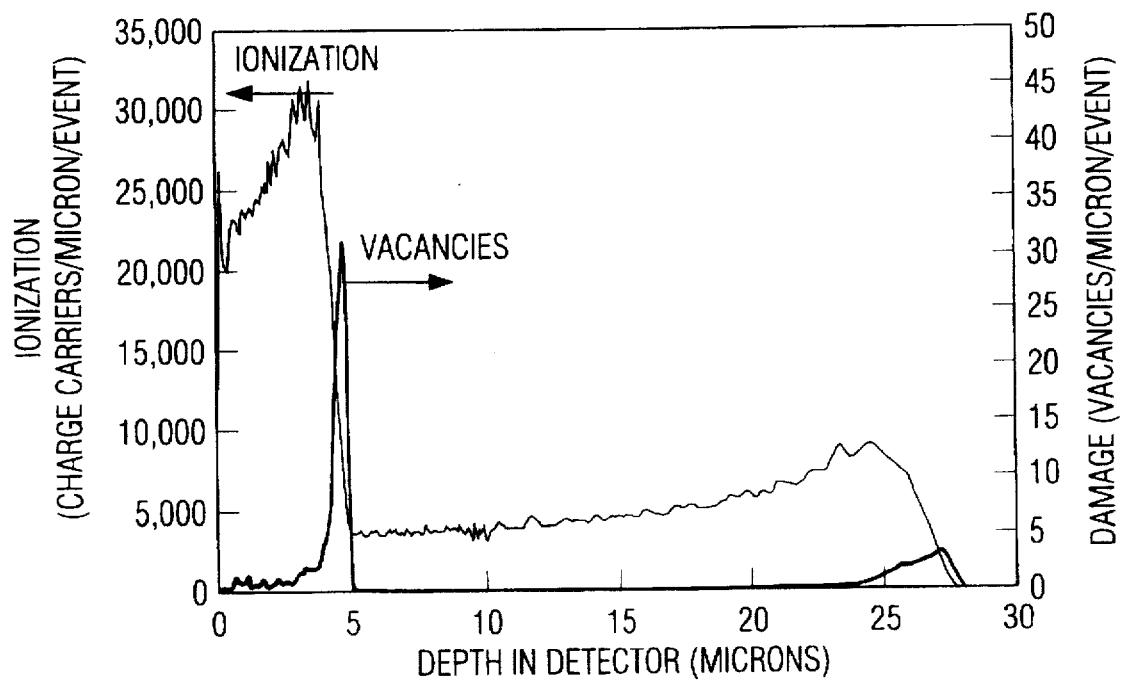
FIG. 6 is a graph of detector depth versus ionization and vacancy production for $^6Li$ reaction products in a silicon carbide detector with collimated reaction products.

An energy deposition curve for a collimated beam with Li as the neutron converter layer and SiC as the semiconductor active region is shown in FIG. 6. Although slight broadening of the damage peak is noted, the number of vacancies produced in the first 3.5 microns of the detector approximates the levels obtained from a normally incident beam, as shown in FIG. 4. While the use of a collimator may reduce the overall signal of the device by eliminating a proportion of the incident radiation, compensation for this signal loss may be provided by increasing the concentration of Li in the neutron convertor layer. Alternatively, microchannelling devices may be used to eliminate shallow incident angles. However, the increased collimation provided by such devices may not be sufficient to justify the resultant decrease in signal intensity.

The neutron detectors of the present invention are preferably capable of generating an electronic pulse for neutron fluxes ranging from about 1 to $10^{10}$ n/cm$^2$/sec, and more preferably from about 0.1 to $10^{12}$ n/cm$^2$ sec. The detectors are thus suitable for many different applications, including power monitoring of nuclear reactors, monitoring of spent nuclear fuel rods and monitoring of nuclear waste. The ability to measure a wide range of nuclear fluxes makes the detectors particularly suitable for monitoring nuclear reactor start up, ramp up and full power operations.

The following examples are intended to illustrate various aspects of the present invention and are not intended to limit the scope thereof.

EXAMPLE 1

A neutron detector is made by forming a SiC substrate 500 microns thick. The SiC substrate is formed by the process of high-purity crystal growth. An N-type SiC layer 8 microns thick and 400 microns in diameter having a composition of $1 \times 10^{15}$ nitrogen atoms per cm$^3$ is deposited on the SiC substrate by chemical vapor deposition. A P-type SiC layer 1.2 microns thick and 400 microns in diameter having a composition of $10^{19}$ nitrogen atoms per cm$^3$ is deposited on the N-type layer by chemical vapor deposition. An electrical contact layer comprising gold having a thickness of 0.2 micron is deposited on the P-type layer by vapor deposition. A layer of SiO$_2$ having a thickness of 1.5 microns is deposited over the contact layer and doped SiC layers by chemical vapor deposition. A neutron converter layer 2 microns thick comprising $^6$LiF is deposited on the SiO$_2$ insulating layer by chemical vapor deposition. Electrical connections are made to the conducting SiC substrate and contact layer by means of micro soldering.

EXAMPLE 2

A neutron detector is made by forming a SiC substrate 500 microns thick. The SiC substrate is formed by the process of high-purity crystal growth. An n$^+$ layer 1.5 microns thick and 400 microns in diameter having a composition of greater than $10^{18}$ nitrogen atoms per cm$^3$ is deposited on the SiC substrate by chemical vapor deposition. An n$^-$ layer 3 microns thick with a diameter of 400 microns having a nitrogen impurity concentration of $10^{15}$ atoms per cm$^3$ is deposited on the n$^-$ layer by chemical vapor deposition. A Schottky metal contact consisting of 0.05 microns of nickel with a diameter of 400 microns is deposited on the n$^-$ SiC layer by vacuum deposition. A gold protective layer 1 micron thick with a diameter of 400 microns is deposited on the nickel Schottky layer. A neutron converter layer 2 microns thick and 400 microns in diameter comprising Li is deposited on the gold protective layer by vapor deposition. Electrical contacts are established to the SiC substrate and Schottky metal by micro soldering and a metallic pad contact, respectively.

EXAMPLE 3

A neutron detector is formed as in Examples 1 and 2, except a collimator structure is added. In the case of the detector of Example 1, the collimator structure is placed between the SiO$_2$ layer and the neutron converter layer. In the case of Example 2, the collimator structure is placed between the gold protective layer and the neutron converter layer. In both cases, the neutron converter layer is free-standing and is made by vacuum deposition of LiF onto a nickel backing layer 4 microns thick. The collimator structure consists of an annular aluminum layer with a thickness of 400 microns and a diameter of 400 microns, and having an annulus with a diameter of 200 microns. The collimator structure is produced by a combination of vapor deposition and reactive-ion etching.

The neutron detector of the present invention possesses several advantages over conventional designs. The use of a relatively thin semiconductor active region substantially reduces radiation damage. The use of a thin semiconductor active region also provides for gamma discrimination because the active thickness of the detector may be less than the range of most gamma radiation. This allows the detectors to measure neutron flux in the presence of large gamma fields. Furthermore, the use of high temperature resistant materials such as silicon carbide in the active region of the detector permits extended use in high temperature environments such as nuclear reactors.

While certain embodiments of the present invention have been described, various changes, modifications and adaptations may be made without departing from the scope of the invention, as set forth in the following clams.

What is claimed is:

1. A neutron detector comprising:
   a neutron converter layer capable of generating charged particles having at least one range upon impingement of the neutron converter layer by neutrons; and
   a semiconductor active region positioned to receive charged particles from the neutron converter layer and to generate an electronic pulse in response to ionization caused by the charged particles, the semiconductor active region having a thickness smaller than the largest range of the charged particles and positioned within the largest range of the charged particles.

2. The neutron detector of claim 1, wherein the neutron converter layer comprises a material selected from the group consisting of Li, B and H.

3. The neutron detector of claim 1, wherein the neutron converter layer comprises Li.

4. The neutron detector of claim 1, wherein the thickness of the semiconductor active region is less than about 20 microns.

5. The neutron detector of claim 1, wherein the semiconductor active region is adjacent to the neutron converter layer.

6. The neutron detector of claim 5, wherein the neutron converter layer comprises Li, the charged particles comprise He and H ions, and the thickness of the semiconductor active region is less than the range of the He and H ions.

7. The neutron detector of claim 5, wherein the neutron converter layer comprises B, the charged particles comprises Li and He ions, and the thickness of the semiconductor layer region is less than the range of the Li and He ions.

8. The neutron detector of claim 1, wherein the semiconductor active region is spaced apart from the neutron converter layer.

9. The neutron detector of claim 8, wherein the neutron converter layer comprises Li, the charged particles comprise He and H ions, and the active region is spaced apart from the neutron converter layer a distance greater than the range of the He ions and less than the range of the H ions.

10. The neutron detector of claim 8, wherein the neutron converter layer comprises B, the charged particles comprise Li and He ions, and the semiconductor active region is spaced apart from the neutron converter layer a distance greater than the range of the Li ions and less than the range of the He ions.

11. The neutron detector of claim 1, wherein the semiconductor active region comprises a material capable of operating at temperatures above about 100° C.

12. The neutron detector of claim 1, wherein the semiconductor active region comprises a P-N junction.

13. The neutron detector of claim 1, wherein the semiconductor active region comprises a Schottky diode.

14. The neutron detector of claim 1, wherein the semiconductor active region comprises a material selected from the group consisting of SiC, diamond, GaAs, GaP, PbO, CdS, Si and Ge.

15. The neutron detector of claim 1, wherein the semiconductor active region comprises SiC.

16. The neutron detector of claim 15, wherein the thickness of the semiconductor active region is less than about 20 microns.

17. The neutron detector of claim 15, wherein the thickness of the semiconductor active region is less than about 5 microns.

18. The neutron detector of claim 15, wherein the semiconductor active region comprises a layer of P-type SiC and a layer of N-type SiC.

19. The neutron detector of claim 18, wherein the P-type SiC layer is from about 0.5 to about 2 microns thick and the N-type SiC layer is from about 1 to about 5 microns thick.

20. The neutron detector of claim 15, wherein the neutron converter layer comprises Li, the semiconductor active region is adjacent to the neutron converter layer, and the thickness of the semiconductor active region is less than about 5 microns.

21. The neutron detector of claim 15, wherein the neutron converter layer comprises B, the semiconductor active region is adjacent to the neutron converter layer, and the thickness of the semiconductor active region is less than about 1.5 microns.

22. The neutron detector of claim 15, wherein the neutron converter layer comprises Li, the semiconductor active region is spaced apart from the neutron converter layer at least about 5 microns, and the thickness of the semiconductor active region is less than about 20 microns.

23. The neutron detector of claim 22, wherein the thickness of the active region is from about 1 to about 10 microns.

24. The neutron detector of claim 15, wherein the neutron converter layer comprises B, the semiconductor active region is spaced apart from the neutron converter layer at least about 1.8 microns, and the thickness of the semiconductor active region is less than about 1.3 microns.

25. The neutron detector of claim 1, further comprising a collimator between the neutron converter layer and the semiconductor active region.

26. The neutron detector of claim 25, wherein the collimator has an inner passage having a length of at least about twice its width.

27. The neutron detector of claim 1, further comprising at least one insulating layer between the neutron converter layer and the semiconductor active region.

28. The neutron detector of claim 27, wherein the at least one insulating layer comprises $SiO_2$.

29. The neutron detector of claim 1, wherein the semiconductor active region is supported on a conducting substrate.

30. The neutron detector of claim 29, wherein the conducting substrate comprises SiC.

31. The neutron detector of claim 1, wherein the semiconductor active region is capable of generating an electronic pulse for neutron fluxes ranging from about 1 $n/cm^2$/sec to about $10^{12}$ $n/cm^2$/sec.

32. The neutron detector of claim 1, wherein the semiconductor active region is capable of generating an electronic pulse for neutron fluxes ranging from about 0.1 $n/cm^2$/sec to about $10^{12}$ $n/cm^2$/sec.

* * * * *